US 8,403,659 B2

(12) United States Patent
Szokolay

(10) Patent No.: US 8,403,659 B2
(45) Date of Patent: Mar. 26, 2013

(54) MOLD TOOLING WITH INTEGRATED THERMAL MANAGEMENT FLUID CHANNELS AND METHOD

(76) Inventor: Robert E. Szokolay, Clermont, FL (US)

( * ) Notice: Subject to any disclaimer, the term of this patent is extended or adjusted under 35 U.S.C. 154(b) by 73 days.

(21) Appl. No.: 12/725,678

(22) Filed: Mar. 17, 2010

(65) Prior Publication Data

US 2010/0170782 A1 Jul. 8, 2010

Related U.S. Application Data

(63) Continuation-in-part of application No. 11/799,358, filed on May 1, 2007, now Pat. No. 7,731,830, and a continuation-in-part of application No. 11/498,681, filed on Aug. 2, 2006, now abandoned.

(51) Int. Cl.
*B29C 33/02* (2006.01)
*B29C 45/73* (2006.01)
*C25D 1/10* (2006.01)
(52) U.S. Cl. ... 425/385; 425/407; 425/547; 264/328.16; 205/70; 249/80
(58) Field of Classification Search .................. 425/385, 425/407, 470, 547, 548, 552, 384, 403, 526; 264/328.14, 328.16, 219; 205/67, 70; 249/114.1–116, 134, 135, 79–80
See application file for complete search history.

(56) References Cited

U.S. PATENT DOCUMENTS

| | | | | |
|---|---|---|---|---|
| 3,723,584 A | * | 3/1973 | Nussbaum | 264/46.6 |
| 4,164,971 A | * | 8/1979 | Strand | 411/301 |
| 4,442,061 A | * | 4/1984 | Matsuda et al. | 264/328.7 |
| 5,041,247 A | * | 8/1991 | Kim | 264/37.1 |
| 5,106,483 A | * | 4/1992 | Kitano | 205/148 |
| 5,232,653 A | * | 8/1993 | Addeo et al. | 264/515 |
| 5,260,014 A | * | 11/1993 | Holton et al. | 264/134 |
| RE34,862 E | * | 2/1995 | Czor | 205/67 |
| 5,397,812 A | * | 3/1995 | Usami et al. | 522/13 |
| 5,437,547 A | * | 8/1995 | Holton et al. | 425/548 |
| 5,635,546 A | * | 6/1997 | Rich et al. | 523/176 |
| 5,853,520 A | * | 12/1998 | Rich et al. | 156/293 |
| 6,846,445 B2 | * | 1/2005 | Kim et al. | 264/404 |
| 6,939,123 B2 | * | 9/2005 | Peterson et al. | 425/470 |

(Continued)

FOREIGN PATENT DOCUMENTS

| | | | | |
|---|---|---|---|---|
| JP | 60152691 | A | * | 8/1985 |
| JP | 10202663 | A | * | 8/1998 |

(Continued)

OTHER PUBLICATIONS

Translation of JP 10-202663 A.*

(Continued)

*Primary Examiner* — Dimple Bodawala
(74) *Attorney, Agent, or Firm* — McKinney Law, PLLC

(57) ABSTRACT

An electroformed tooling device is disclosed. The device includes an electroformed tool with electrodeposited metal which has been plated from a structured substrate on a molding side to function as a molding surface and an uneven contour on a non-molding side of the electroformed tool left as a by-product of electroforming. The device also includes a blank base comprising a top surface, a network of thermal management channels, and at least a first opening and a second opening communicating with the network of thermal management channels to allow fluid to flow into the first opening and flow through the network of thermal management channels and flow out the second opening. The top surface further includes an electro-discharge machined contoured surface to mate with the uneven contour on the non-molding side of the electroformed tool. Fluid flowing through the thermal management channels cools or alternately cools and heats the electroformed tool.

5 Claims, 4 Drawing Sheets

U.S. PATENT DOCUMENTS

| | | | |
|---|---|---|---|
| 7,731,830 B2 * | 6/2010 | Szokolay | 205/67 |
| 2008/0029397 A1 * | 2/2008 | Szokolay | 205/67 |
| 2008/0254162 A1 * | 10/2008 | Iimura et al. | 425/547 |

FOREIGN PATENT DOCUMENTS

| JP | 11291300 A | * | 10/1999 |
|---|---|---|---|
| JP | 2004249562 A | * | 9/2004 |
| JP | 2006082454 A | * | 3/2006 |
| JP | 2006281464 A | * | 10/2006 |

OTHER PUBLICATIONS

Translation of JP 2006-82454 A.*

* cited by examiner

MOLD TOOLING WITH INTEGRATED THERMAL MANAGEMENT FLUID CHANNELS AND METHOD

I. CROSS-REFERENCE TO RELATED APPLICATIONS

This application is a continuation in part of U.S. patent application Ser. No. 11/799,358 filed May 1, 2007, which is now U.S. Pat. No. 7,731,830, and U.S. patent application Ser. No. 11/498,681 filed Aug. 2, 2006, which is now abandoned.

II. FIELD OF THE DISCLOSURE

The present invention relates to molding tooling and embossing tooling used in molding and embossing micro- and nano-structures, as well as general purpose molding, and in particular to enhanced molding or embossing tooling formed with an attached base with flow through channels for hot and cold fluid, the top of the base being shaped by electro-discharge machining to mate with the uneven bottom surface of the electroformed plate and the method of forming the tooling.

III. BACKGROUND

Industries specializing in injection molding, gas-assisted injection molding, slush molding, blow molding, and thermoforming processes strive to mold articles at faster cycle times. Efforts to cut cycle times (and, thereby, manufacturing costs) typically focus on the cooling process, as it is generally the longest part of any cycle. One approach to shortening the cycle time is directed to the mold components (i.e., cavity and core). Mold components are generally constructed using blocks of metal. The profile or details of the molding surface are typically machined into the metal blocks. Channel patterns, e.g., thermal management channels, are then drilled from various angles such that the channels intersect one another to form thermal management circuits. One drawback of the resulting mold component is that the channels are drilled at straight lines into the metal, and the resulting channel patterns generally cannot conform well to the shape of the intended molded article. This non-conformity causes uneven heat transfer between the mold component and molded article, thus making it difficult to mold products at a faster cycle time and compromising the quality of the molded article (i.e., causing different shrinkage rates due to hot and cold spots in the molded article, resulting in warpage, "sinks", voids, etc.).

Electroforming has long been utilized to make certain types of mold cavities, when the parts to be therein produced have exceptional requirements of form or surface finish (e.g., optical lenses, microstructures). Electroforms are produced by electrodepositing a metal onto a mandrel, which has the shape which corresponds to (but is opposite in phase from) the mold cavity to be produced (i.e., a convex mandrel is used to make a concave cavity), and subsequently separated from the mandrel. The costs of electroformed tooling are high, however, owing to such factors as the high price of the chemicals and metals needed to maintain the electrolyte from which they are deposited, the electrical energy used, and the relatively slow deposition rate, which necessitates a long process time to achieve significant thickness of the electrodeposit. Nonetheless, for certain applications, electroforming is the only known practical way to produce mold components, and so the practice of electroforming has long been tied to molding.

Electroformed mold components suffer the additional disadvantage of being inherently irregular in shape on their back (i.e. non-molding) surface, except in rare instances wherein the cavity shape is very simple (e.g. optical disc molding). Therefore it is generally necessary for a relatively thick electroform to be produced, in order to account for the loss of thickness that results from post-plating machining of the electroformed component, to bring it to finished dimensions that can be accommodated in an automated molding device. This makes the manufacture of electroformed mold components costly (sometimes prohibitively so).

In injection molding and hot embossing of micro/nano-structures, electroforming is frequently employed as a technique for producing tooling. Often, this is the only practical method for replicating structures of such small feature sizes, with sufficient fidelity. Unfortunately, this presents a problem, as the backsides of electroforms are inherently non-uniform and hence typically require extensive post-plating machining to planarize, or otherwise finish the back surface of the electroformed tool. This is necessary, in order to facilitate heat exchange between the tool, and the platen against which it is mounted. Heating and cooling means are typically integrated into this platen or mold base in order to regulate the temperature of the tooling at the tool/plastic interface, where molding/embossing takes place. Quicker, more responsive control of the tool temperature facilitates better replication fidelity, and allows for minimization of process cycle times. Prior art tooling does not adequately address the problem of minimizing the time involved in the operation while maximizing heating and cooling efficiency of the tooling.

In both micro molding, embossing, and general-purpose molding, Kim, et al (U.S. Pat. No. 6,846,445) taught that molds could be thermally cycled very rapidly, and that conformal cooling was beneficial. However, they passed high frequency current through the mold components to heat them; cleverly taking advantage of the skin effect and the proximity effect, but this approach necessitates some rather cumbersome and costly components, and requires that the mold halves remain within 10 cm of each other during the heating phase. This means that heating cannot take place during part removal, if said removal requires that the mold halves be separated by a distance greater than 10 cm, which is not unusual for deep molds with long cores. They also did not claim nor explain a method indicating how the conformal cooling should be accomplished.

Peterson, et al (U.S. Pat. No. 6,939,123) taught that an electroformed mold component could be made, by laminating an electroformed segment ("stamper") to a backing block, which is made of machined metal, using an adhesive to bond them together. However, the preparation of such a backing block that would be suitable for a complex shaped electroformed segment, as well as machining the "plurality of projections" described in this patent, require relatively complex and tedious machining operations, and thus this method is also rather cumbersome.

Moore, et al (U.S. Pat. No. 7,004,221) taught a method for manufacturing a mold from two or more joined segments, either or both of which could have some portion of the cooling channel network machined therein, said channel network being conformal to the mold cavity, and joining the two together by employing hot isostatic pressing (HIP), or alternatively using metal tubing to form the channel network, and embedding said tubing in (presumably) powdered metal, which is subsequently densified and joined to another segment or segments by the HIP process. Although this process is perhaps workable for some mold cavities, it does not address the applications (e.g. optics) wherein extremely stringent standards of form and surface finish are required, as it requires the mold cavity to be either cast, or machined. This would not be feasible in many cases, because of the difficulties of generating those forms in a massive mold, unless electroforming was employed to produce those segments. However, electroformed items made of nickel (a very widely applied metal) often contain trace amounts of sulfur, which render them sensitive to the high temperatures typically employed in the HIP process, hence eliminating such electroformed articles as potential mold segments in such a process.

What is needed is embossing and molding tooling formed by a rapid process of attaching a blank to an electroform without having to planarize the back surface of the electroform, the blank having integrated conformal flow-through channels attached as part of the tooling for a quicker, more responsive temperature control with heating and cooling to be facilitated by passing a heat exchange medium (fluid) through the integrated channels in the embossing/molding die.

It is, therefore, to the effective resolution of the aforementioned problems and shortcomings of the prior art that the present invention is directed.

However, in view of the prior art at the time the present invention was made, it was not obvious to those of ordinary skill in the pertinent art how the identified needs could be fulfilled.

IV. SUMMARY

The disclosed invention addresses these problems by offering a method of producing an electroformed mold component that is relatively fast and easy to manufacture, because it may be made thinner than is conventionally practiced, and has improved thermal management characteristics when compared to conventionally produced mold components, electroformed or otherwise.

An object of the present invention is to provide a device and method for embossing and molding tooling formed by a rapid process of attaching a metal blank to an electroform without having to planarize, or otherwise mechanically altering, the profile of the back surface of the electroform, by using electro-discharge machining (EDM) to quickly shape the top of the blank to conform precisely to the back surface of the electroform, using the electroform as the electrode in the EDM process, and then attaching the electroform and blank together as integrated embossing or molding tooling, the blank having integrated flow-through channels attached as part of the tooling for a quicker, more responsive temperature control with thermal management to be facilitated by passing a heat exchange medium (fluid) through the integrated channels in the embossing/molding tooling or die to fit within existing limited space in embossing and molding equipment.

Another object of the present invention is to provide a method for creating a molding/embossing tool with integrated thermal management channels, without the necessity of planarizing or otherwise altering the profile of the electroform's uneven deposit on the non-structured side to prevent damage to the electroformed tool.

One more object of the present invention is to seal and cure the electroformed tool to the blank base using a liquid-tight structural adhesive or to interconnect the electroformed tool and blank base using screws and sealing them together with a sealant, such as a silicone based adhesive, or a ceramic/metal refractory adhesive, to allow for higher maximum temperatures to extend the application of the device to molding materials with higher melting/glass transition temperatures.

In brief, an electroformed tool has an integrated base with channels contacting the electroform with heating and cooling fluids flowing through the channels during molding or embossing. A blank base is machined with a network of interconnected open channels on a top surface and flow through passageways communicating with the channels. The electroform is used as an electrode to erode the top surface of the blank base using plunge electro-discharge machining by lowering the uneven contour on the bottom of the electroform down onto the top surface of the blank base in the electro-discharge machining environment to form a top contoured surface to mate with the uneven contour on the non-embossing side of the electroform. The electroform and base are sealed together.

A primary advantage of the present invention is that it provides for a quicker, more responsive temperature control in an electroformed tool by integrating fluid channels in direct contact with the electroform with heating and/or cooling to be facilitated by passing a heat exchange medium (fluid) through the integrated fluid channels. Since the channel pattern for the conformal thermal management system are defined on one side by the back surface of the electroformed segment it is inherently conformal to the contour of the molded article, because the electroform, although not absolutely uniform in thickness, will nonetheless have a back surface, which closely conforms to the surface of the mold cavity. The proximity of the channels to the molded article is defined and determined by the thickness of the electroformed segment. This creates a favorable situation, wherein the thinner the electroform, the closer the thermal management channels are to the mold cavity, which means the electroform thickness need only be as great as is necessary to maintain the structural integrity of the mold component. This is in stark contrast to the common practice of plating an electroformed component extra thick, to allow for thickness lost to post-plating machining of the electroform, in order to achieve a shape that can be applied to an automated molding device (e.g. an injection mold base). Consequently, costly electroforming time and material are spared, as is electrical energy.

A related advantage of the present invention is that it provides an electroformed tool with integrated conformal fluid heating and cooling channels, which fits within existing limited space in embossing and molding equipment.

Another advantage of the present invention is that it provides a rapid process of attaching a blank to an electroform, and eliminates the need to planarize or otherwise reshape the back surface of the electroform, thereby avoiding potential deformation of the electroform, or other damage.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
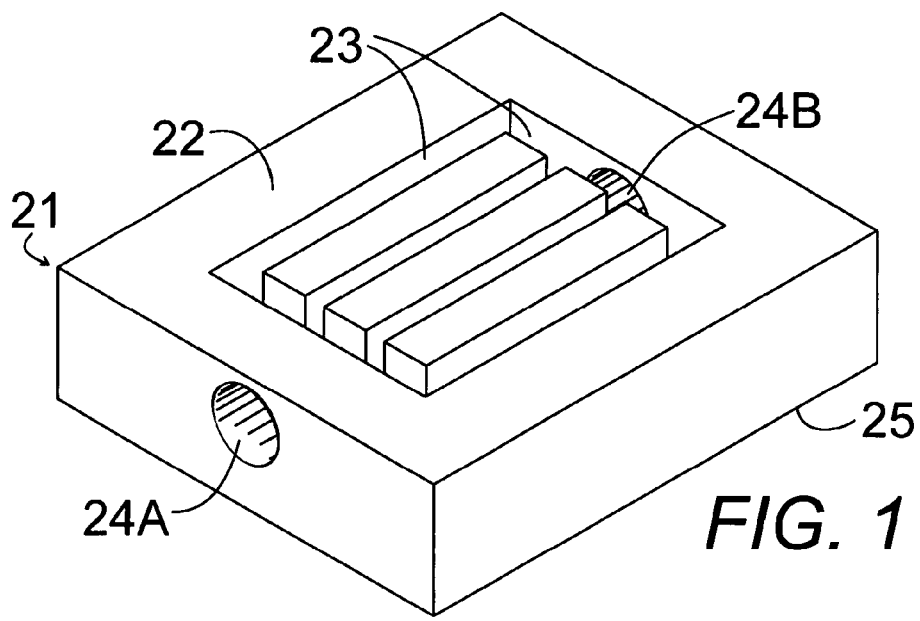
FIG. 1 is a perspective view of the blank base of the invention showing the top channels and the end flow through openings.
Figure 2:
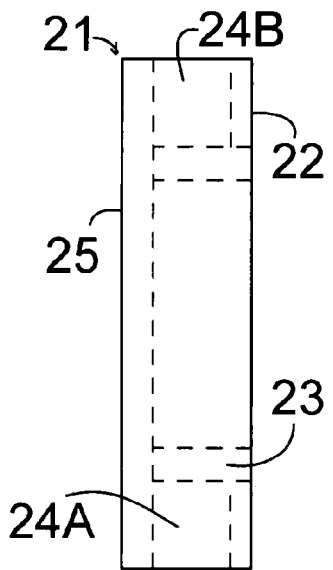
FIG. 2 is a side view of the blank base of FIG. 1.
Figure 3:
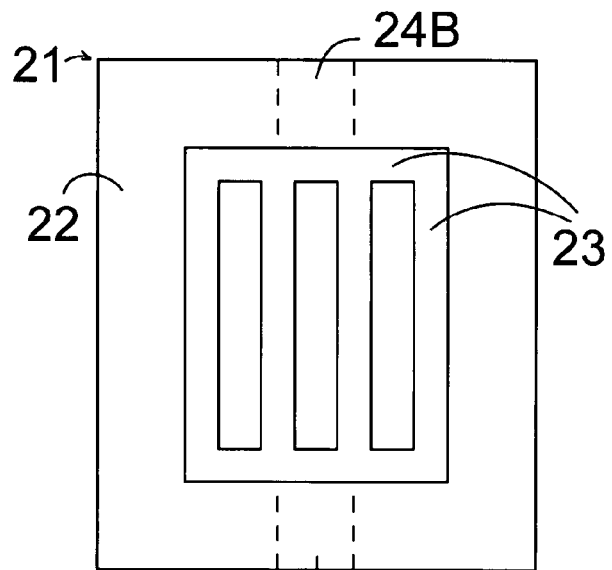
FIG. 3 is a top plan view of the blank base of FIG. 1.
Figure 4:
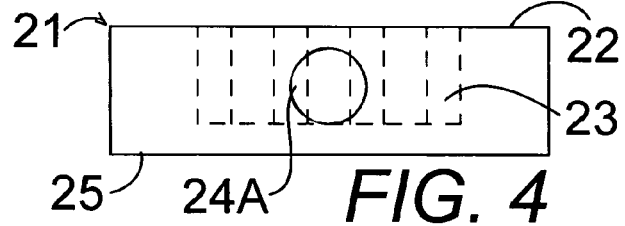
FIG. 4 is an end view of the blank base of FIG. 1.
Figure 5:
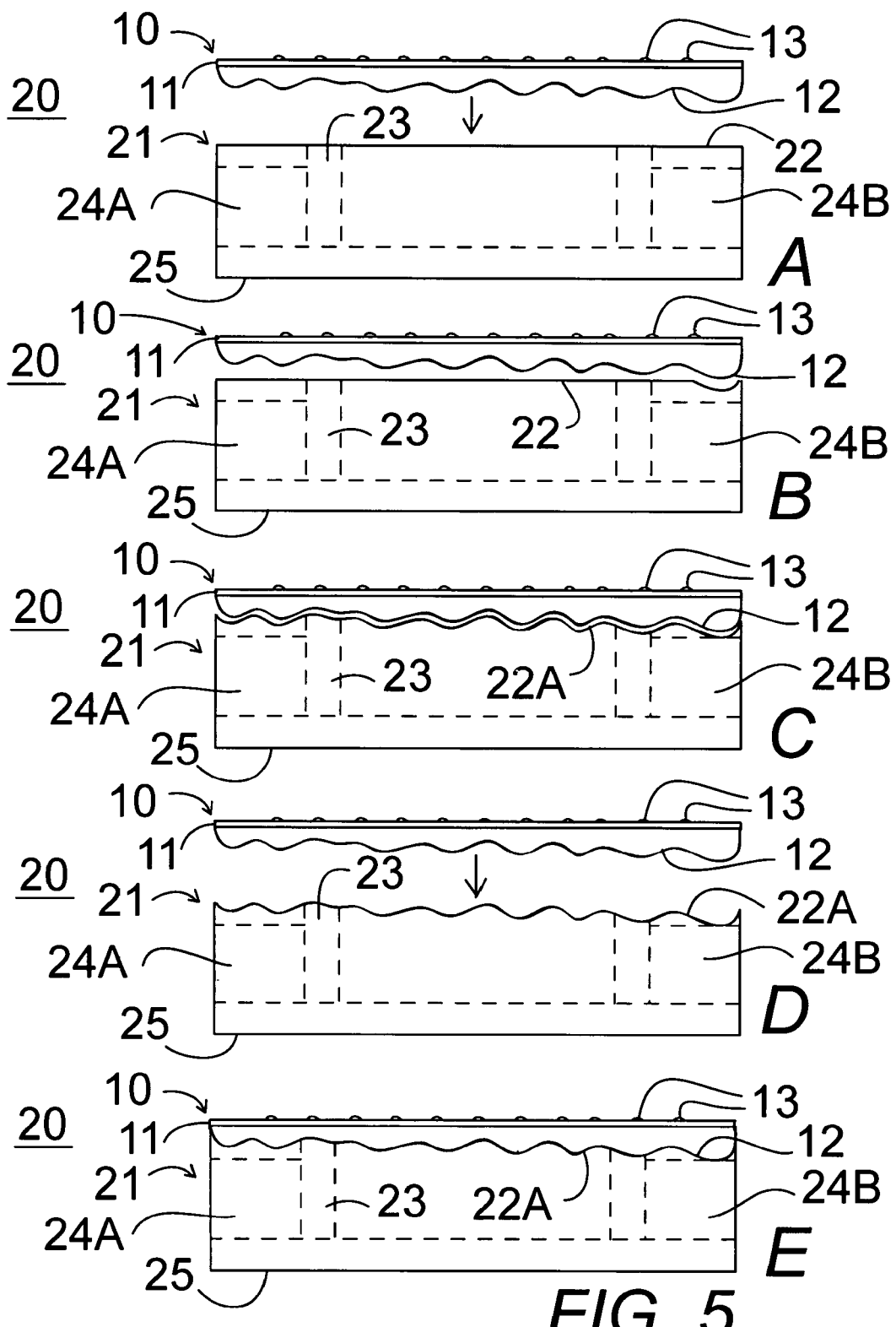
FIG. 5A is a side view of the blank base of FIG. 1 and the electroform aligned with the top of the blank base showing the top embossing side of the electroform to function as an embossing surface and an uneven contour on a non-embossing bottom side of the electroform left as a by-product of electroforming.
FIG. 5B is a side view of the blank base and the electroform aligned with the top of the blank base of FIG. 5A showing the beginning of the process of using the electroform as an electrode to erode the top surface of the blank base using plunge electro-discharge machining to form a contoured surface to mate with the uneven contour of the non-embossing side of the electroform.
FIG. 5C is a side view of the blank base and the electroform aligned with the top of the blank base showing the completion of the process of using the electroform as an electrode to erode the top surface of the blank base using plunge electro-discharge machining to form a contoured surface to mate with the uneven contour on the non-embossing side of the electroform.
FIG. 5D is a side view of the blank base of FIG. 5C and the uneven contour of the bottom of the electroform aligned with the contoured top of the blank base.
FIG. 5E is a side view of the contoured blank base and the electroform secured together with the uneven contour of the bottom of the electroform mating with the contoured top of the blank base to form an electroformed tooling device with integral heating and cooling fluid channels for use in molding or embossing.

In FIGS. 1-9, an electroformed tooling device 20 with integral thermal management fluid channels for use in molding and/or embossing is shown in various stages of fabrication. The term "molding" hereinafter being defined to include embossing, and the term "mold" hereinafter defined as including embossing dies.

In FIGS. 5A-5E, an electroform 10 with an embossing surface and an uneven contour 12 on the bottom non-embossing side left as a by-product of electroforming.

In FIGS. 1-4 and 5A, a blank base 21 comprises a block of metal with a smooth flat bottom surface 25, a top surface 22 having a network of open channels 23 in the top surface, and one or more surfaces, each having an opening 24A and 24B therein, communicating with the network of open channels to allow fluid to flow into a first opening, such as the end opening 24A and flow through the network of open channels 23 and flow out a second opening, such as the end opening 24B. The machining of the blank base comprises milling, drilling, grinding and turning techniques. The channels are so arranged, that the area in which they are contained is smaller than the projected area of the electroformed tool.

In FIGS. 5C-5E, the top surface 22 of the blank base 21 further comprising an electro-discharge machined contoured surface 22A to mate with the uneven deposit 12 on the bottom non-embossing side of the substrate.

In FIG. 5E, the electroformed tool 10 and the blank base 21 with the contoured top 22A are interconnected by a means of securing the electroformed tool 10 to the blank base 21 with the non-embossing side 12 contacting and mating with the corresponding contoured top surface 22A of the blank base to form an electroformed tool with integral heating and cooling channels 23 so that hot and cold fluid flowing through the blank base network of open channels 23 contacts the electroformed tool to alternately heat and cool the electroformed tool during use in injection molding and hot embossing processes to manufacture items such as microfluidic devices, optical reflectors or molds, holograms or other precision formed articles. The means of securing the electroformed tool 10 to the blank base 21 may comprise a liquid-tight structural adhesive which is cured to bind them together or the means of securing the electroformed tool 10 to the blank base 21 may comprise a threaded fastener and a sealant for a liquid-tight device, preferably, but not limited to, a silicon based or ceramic/metallic based adhesive sealant for use in high temperatures, or other securing means to bind them together with a liquid-tight fit (e.g. brazing).

A method of making an electroformed tooling device 20 with integral thermal management fluid channels for use in molding and embossing comprises the steps illustrated in FIGS. 5A-5B.

In FIG. 5A, a first step comprises forming an electroformed tool 10 by electroforming from a structured substrate to electrodeposit metal to form 13 the molding side of the tool to function as an embossing or molding surface while leaving an uneven contour 12 on a non-molding side of the electrodeposit, left as a by-product of electroforming.

A second step comprises machining a block of metal to form a blank base 21, shown in FIGS. 1-4 and 5A. The blank base 21 comprises a smooth flat bottom surface (or other shape designed to conform to the automated molding device) 25, a top surface 22 having a network of open channels 23 in the top surface, and one or more surfaces having an end opening 24A and 24B therein communicating with the network of open channels 23 to allow fluid to flow into a first opening, such as the end opening 24A, and flow through the network of open channels 23 and flow out a second opening, such as the end opening 24B. The fluid could flow in either direction from one opening to the other.

The machining of the blank base comprises conventional milling, drilling, grinding and turning techniques. The finished blank base 21 has a series of deep grooves 23, milled from above, with the flat top surface 22, left undisturbed, between the grooves 23. This pattern of grooves and top surface, when sealed off in subsequent steps, forms the thermal management fluid channels. The openings 24A and 24B are drilled, through one or more surfaces of the blank base 21, intersecting the channels 23.

In FIGS. 5B and 5C, a third step comprises using the electroformed tool 10 as an electrode to erode the top surface 22 of the blank base 21 using plunge electro-discharge machining to erode the top surface to form a top contoured surface 22A to mate with the uneven deposit 12 on the non-embossing side of the electroform 10 by lowering the uneven contour 12 on the bottom of the electroformed tool 10 down onto the top surface 22 of the blank base 21 in the electro-discharge machining environment. The top contoured surface 22A of the blank base 21 should not be as deep as the pre-milled thermal management channels 23, so as not to completely block those channels after subsequent interconnecting of the electroformed tool 10 and the blank base 21.

In FIGS. 5D and 5E, a fourth step comprises interconnecting the electroformed tool 10 and the blank base 21 by a means of securing the electroformed tool to the blank base with the non-molding side 12 of the electroform 10 contacting the mating top contoured surface 22A of the blank base to form an electroformed tool with integral thermal management channels 23 so that hot and cold fluid flowing through the blank base network of open channels 23 contacts the electroformed tool 10 to cool or alternately heat and cool the electroformed tool during use in molding and embossing processes.

The electroformed tool 10 may be adhered to the blank base 21 using a liquid tight structural adhesive and the structural adhesive cured or alternately screwed to the blank base 21 and adhered to the blank base 21 using a sealant, preferably a silicon based or ceramic/metallic-based adhesive sealant for use of the device in high temperatures, or otherwise secured with the bottom non-embossing side uneven deposit 12 of the electroformed tool 10 mating with the top contoured surface 22A of the blank base 21 so that hot and cold fluid flowing through the channels 23 directly contacts the electroformed tool 10 to heat and cool the tool during molding and embossing processes.

If the bottom 25 of the blank base 21 is not parallel to the top molding surface of the electroformed tool 10, then the method further comprises the step of planarizing the bottom surface 25 of the blank base to make parallel the electroform's top molding surface so that the electroformed tooling device 20 with integral heating and cooling fluid channels 23 fits properly in the equipment used for molding or embossing. This, or any other changes in net shape required to bring the assembly to finished dimensions, may be accomplished by grinding, turning, or fly cutting or employing another conventional subtractive machining process to the bottom surface 25 of the blank base 21, or any other surface of the assembly, as a unit.

Figure 7:
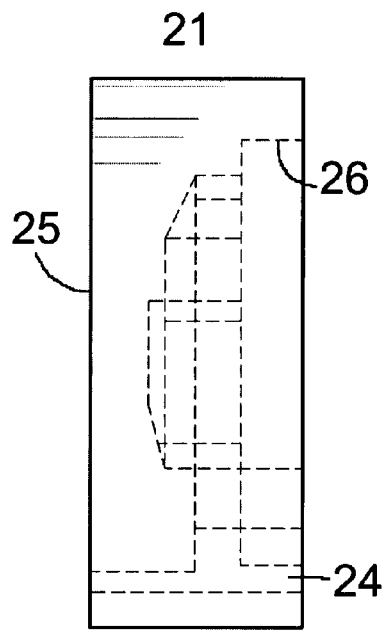
FIG. 7 is a side view of the cylindrical blank base of FIG. 6.
Figure 6:
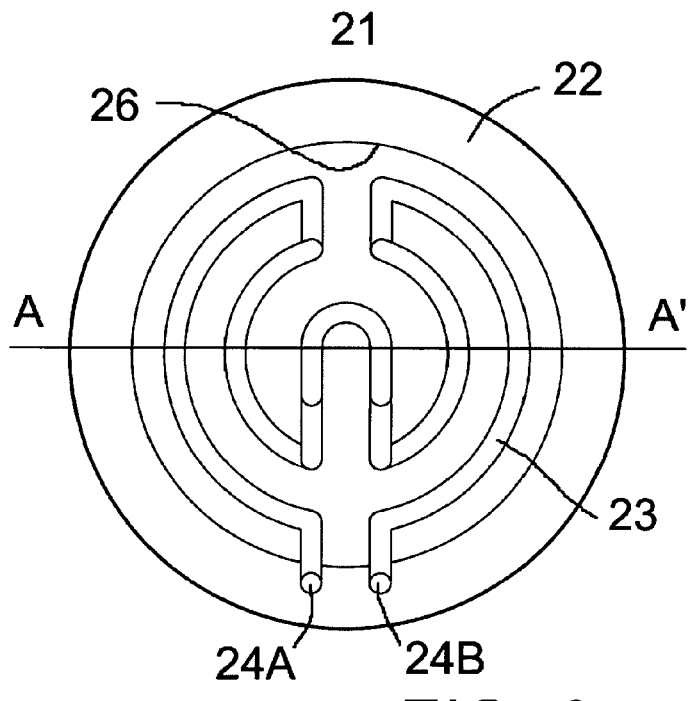
FIG. 6 is a top plan view of the cylindrical blank base, showing the pattern of channels and the rough cavity shape removed.
Figure 8:
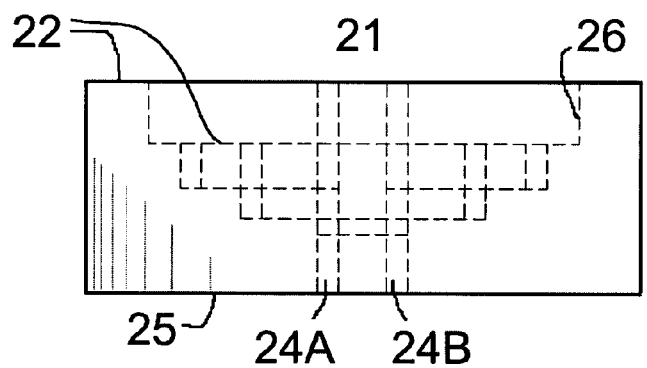
FIG. 8 is another side view of the cylindrical blank base of FIG. 6, orthogonal to FIG. 6 and FIG. 7.
Figure 9:
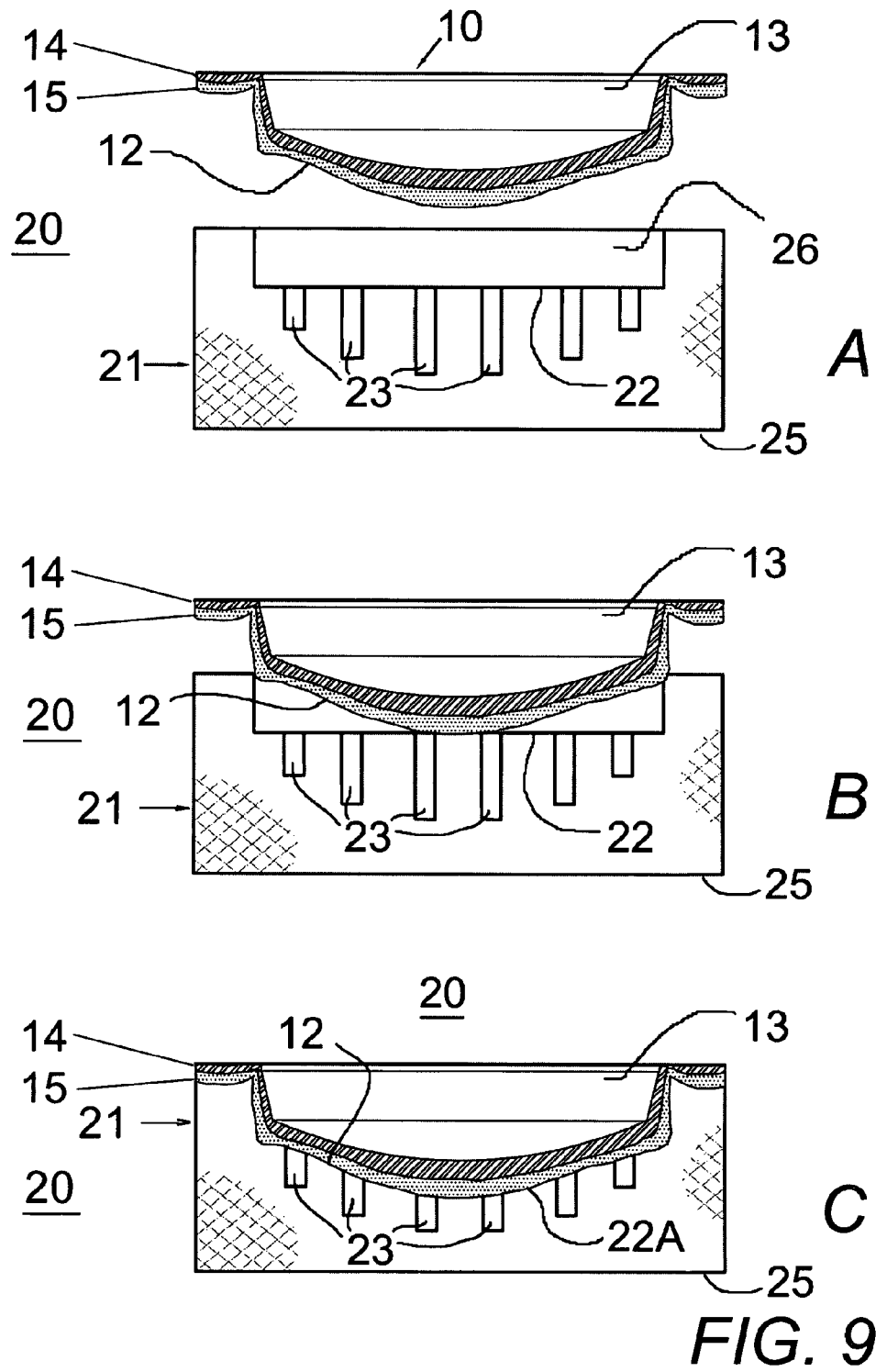
FIG. 9A is a cross sectional view of the cylindrical blank base, viewed along line A-N of FIG. 6, with a similar cross section of the electroform aligned above it.
FIG. 9B illustrates the relationship between the blank base and the electroform at the beginning of the EDM process.
FIG. 9C illustrates the relationship between the electroform and the blank base at the end of the EDM process.

FIGS. 6, 7, and 8 are orthogonal views of a blank base 21 for a general purpose (macro) molding insert, which, in this example, is cylindrical, but may be of any arbitrary shape. Inlet 24A and outlet 24B holes are, in this example, accessed through the bottom 25 of the blank. A rough cavity 26 may be created by conventional subtractive machining processes (e.g. milling), to reduce the amount of material, which must be removed in the subsequent EDM process. A pattern of thermal management channels 23 communicates with the inlet and outlet holes 24A and 24B. Line A-A' denotes the position of the cross sectional views illustrated in FIG. 9A-9C.

In FIG. 9A-9C the EDM and joining sequence is similar to the micro replication case, but because some molded shapes may not be planar, significant relief may be accommodated by roughing out a cavity 26. In the illustrated case, the electroformed tool 10 comprises two electrodeposited metallic layers, the first layer 14, forming the molding surface, being of a metal chosen for wear or other characteristics (e.g. nickel), and a second layer 15, being of a metal chosen for its high thermal conductivity (e.g. copper), as the last-deposited surface of the electroform 22, will be in direct contact with the thermal management channels in the finished tool 20.

In FIG. 9A, the first step comprises forming an electroformed tool 10 by electrodepositing a selected metal or metals to form the molding side 13 of the tool to function as a molding surface while leaving an uneven contour on a non-molding side 12 of the electrodeposit, left as a by-product of electroforming.

The second step comprises machining a block of metal to form a blank base 21, shown in FIGS. 6-8 and 9A. The blank base 21 comprises a smooth flat bottom surface 25 (or other shape designed to conform to the automated molding device), a top surface 22 having a network of open channels 23 in the top surface, and one or more surfaces having openings 24A and 24B therein communicating with the network of open channels 23 to allow fluid to flow into a first opening, such as the opening 24A, and flow through the network of open channels 23 and flow out a second opening, such as the opening 24B. The fluid could flow in either direction from one opening to the other.

The machining of the blank base comprises conventional milling, drilling, grinding and turning techniques. The finished blank base 21 has a series of deep grooves 23, milled from above, with the flat top surface 22, left undisturbed, between the grooves 23. This pattern of grooves and top surface, when sealed off in subsequent steps, forms the thermal management fluid channels. The openings 24A and 24B are drilled, through one or more surfaces of the blank base 21, intersecting the channels 23.

In FIG. 9B the third step comprises using the electroformed tool 10 as an electrode to erode the top surface 22 of the blank base 21 using plunge electro-discharge machining to erode the top surface to form a top contoured surface 22A to mate with the uneven deposit 12 on the non-embossing side of the electroform 10 by lowering the uneven contour 12 on the bottom of the electroformed tool 10 down onto the top surface 22 of the blank base 21 in the electro-discharge machining environment. The top contoured surface 22A of the blank base 21 should not be as deep as the pre-milled thermal management channels 23, so as not to completely block those channels after subsequent interconnecting of the electroformed tool 10 and the blank base.

In FIG. 9C, a fourth step comprises interconnecting the electroformed tool 10 and the blank base 21 by a means of securing the electroformed tool to the blank base with the non-molding side 12 of the electroform 10 contacting the mating top contoured surface 22A of the blank base to form an electroformed tool with integral thermal management channels 23 so that hot and cold fluid flowing through the blank base network of open channels 23 contacts the electroformed tool 10 to cool or alternately heat and cool the electroformed tool during use in molding processes.

The electroformed tool 10 may be adhered to the blank base 21 using a liquid-tight structural adhesive and the structural adhesive cured or alternately screwed to the blank base 21 and adhered to the blank base 21 using a sealant, preferably a silicon based or ceramic/metallic-based adhesive sealant for use of the device in high temperatures, or otherwise secured with the bottom non-embossing side uneven deposit 12 of the electroformed tool 10 mating with the top contoured surface 22A of the blank base 21 so that hot and cold fluid flowing through the channels 23 directly contacts the electroformed tool 10 to heat and cool the tool during molding and embossing processes.

If the bottom 25 of the blank base 21 is not parallel or in an otherwise geometrically appropriate relationship to the top molding surface of the electroformed tool 10, then the method further comprises the step of shaping the bottom surface 25 of the blank base to be parallel the electroform's top molding surface so that the electroformed tooling device 20 with integral heating and cooling fluid channels 23 fits properly in the equipment used for molding. This, or any other changes in net shape required to bring the assembly to finished dimensions, may be accomplished by grinding, turning, fly cutting, or any other conventional subtractive method of machining to finish the bottom surface 25 of the blank base 21, or any other surface of the assembly, as a unit.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.52(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An electroformed tooling device, the device comprising:
an electroformed tool comprising electrodeposited metal which has been plated from a structured substrate on a molding side to function as a molding surface and an uneven contour on a non-molding side of the electroformed tool left as a by-product of electroforming; and
a blank base comprising a top contoured surface, a network of open thermal management channels in the top surface of the blank base, wherein each of the channels configured to allow fluid flowing through the channels to directly contact the non-molding side of the electroformed tool, while the electroformed tool secured to the top surface of the blank base, and at least a first opening and a second opening communicating with the network of thermal management channels to allow the fluid to flow into the first opening and flow through the network of thermal management channels and flow out the second opening.

2. The device of claim 1, further comprising a liquid-tight structural adhesive to secure the electroformed tool to the blank base.

3. The device of claim 1, further comprising a threaded fastener and a sealant to secure the electroformed tool to the blank base for a liquid-tight device.

4. The device of claim 3, wherein the sealant comprises a silicone-based adhesive or ceramic/metallic-based sealant for use in high temperatures.

5. The device of claim 1, wherein the electroformed tooling device is used in at least one molding process taken from a list of molding processes including micro-molding, nano-molding, general purpose molding of non-planar parts, injection molding, gas-assisted injection molding, slush molding, blow molding, and thermoforming.

* * * * *